United States Patent
Li et al.

(10) Patent No.: US 11,401,616 B2
(45) Date of Patent: Aug. 2, 2022

(54) METHOD FOR MAKING WATER STERILIZATION ELECTRODES AND DEVICE HAVING THE SAME

(71) Applicant: EEnotech, Inc., Sunnyvale, CA (US)

(72) Inventors: Yuanqing Li, Santa Clara, CA (US); Bofei Liu, Palo Alto, CA (US); Sidi Huang, San Jose, CA (US)

(73) Assignee: EENOTECH, INC., Sunnyvale, CA (US)

( * ) Notice: Subject to any disclaimer, the term of this patent is extended or adjusted under 35 U.S.C. 154(b) by 391 days.

(21) Appl. No.: 16/584,806

(22) Filed: Sep. 26, 2019

(65) Prior Publication Data
US 2021/0095382 A1    Apr. 1, 2021

(51) Int. Cl.
| | |
|---|---|
| C25B 1/04 | (2021.01) |
| C25B 11/02 | (2021.01) |
| C02F 1/461 | (2006.01) |
| C25B 11/057 | (2021.01) |
| B82Y 40/00 | (2011.01) |

(52) U.S. Cl.
CPC .......... *C25B 11/02* (2013.01); *C02F 1/46109* (2013.01); *C25B 11/057* (2021.01); *B82Y 40/00* (2013.01); *C02F 2001/46133* (2013.01); *C02F 2001/46161* (2013.01); *C02F 2303/04* (2013.01)

(58) Field of Classification Search
CPC .... C25B 1/04; C25B 9/17; C25B 9/00; C25B 11/051; C25B 11/031; C25B 11/00; C25B 11/043; C25B 11/02; C25B 9/65
See application file for complete search history.

(56) References Cited

U.S. PATENT DOCUMENTS

| 8,808,527 B2 | 8/2014 | Kim |
| 2015/0075992 A1 | 3/2015 | Cui et al. |
| 2018/0127709 A1* | 5/2018 | Mukhopadhyay ...... C23C 16/56 |
| 2020/0247695 A1 | 8/2020 | Zhou et al. |

OTHER PUBLICATIONS

Huo et al., "Nanowire-Modified Three-Dimensional Electrode Enabling Lows-Voltage Electroporation for Water Disinfection", Environmental Science & Technology, vol. 50, Jun. 24, 2016, pp. 7641-7649.
International Search Report and Written Opinion for PCT/US2020/052504 dated Feb. 17, 2021, 9 pages.

* cited by examiner

*Primary Examiner* — Zulmariam Mendez
(74) *Attorney, Agent, or Firm* — Sheppard Mullin Richter & Hampton LLP

(57) ABSTRACT

The method for forming a water sterilization electrode includes heating a conductive medium to an elevated temperature in a heating apparatus. The method further includes growing oxide nanostructures on the conductive medium at the elevated temperature by supplying one or more oxidizing gases to the heating apparatus. The method further includes ramping down from the elevated temperature at 2-30° C./min to a room temperature to form the water sterilization electrode having the oxide nanostructures on the conductive medium.

20 Claims, 10 Drawing Sheets

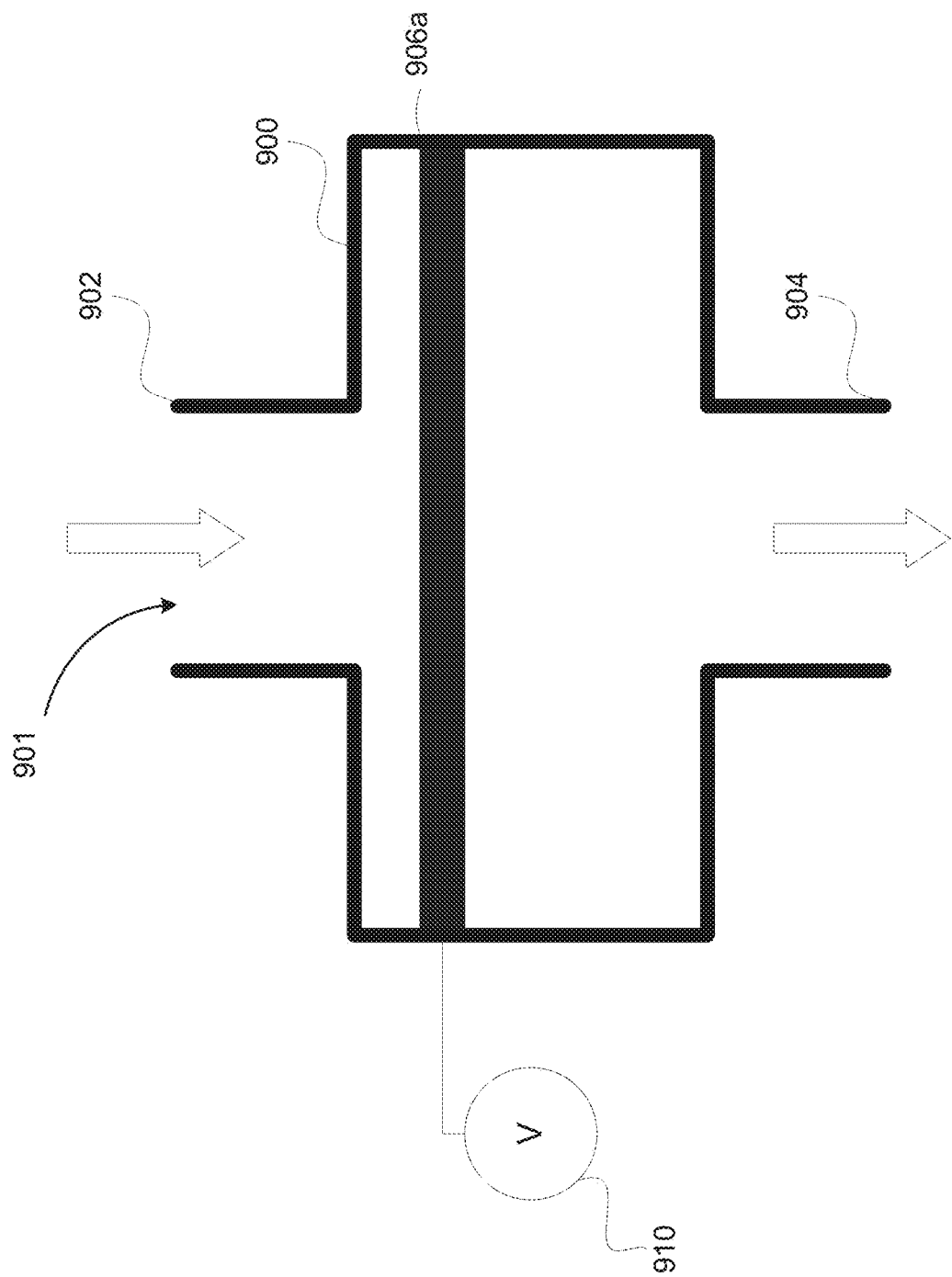

METHOD FOR MAKING WATER STERILIZATION ELECTRODES AND DEVICE HAVING THE SAME

BACKGROUND

The removal of bacteria and other harmful organisms from water is an important process, not only for drinking and sanitation but also industrially as biofouling is a commonplace and serious problem. Conventional methods for water sterilization include chlorination and membrane-based approaches. Unfortunately, both of these types of approaches suffer from certain deficiencies.

Chlorination is typically a slow process, involving incubation times up to an hour or more to allow chlorine species to adequately dissipate through water to be treated. Also, chlorination can yield hazardous oxidation byproducts, including carcinogenic species, and chlorination equipment can be capital intensive, both from the standpoint of deployment and maintenance.

Conventional membrane-based approaches typically operate based on size exclusion of bacteria, which can involve a high pressure drop across a membrane and clogging of the membrane. Moreover, conventional membrane-based approaches can be energy intensive, and can suffer from low flow rates across a membrane.

A more efficient and environmentally friendly water sterilization device is in demand.

SUMMARY

Described herein are methods for making a water sterilization electrode and devices that contain the water sterilization electrode.

In one aspect, the disclosure describes methods for forming a water sterilization electrode. The method includes heating a conductive medium to an elevated temperature in a heating apparatus. The method further includes growing oxide nanostructures on the conductive medium at the elevated temperature by supplying one or more oxidizing gases to the heating apparatus. The method further includes ramping down from the elevated temperature at 2-30° C./min to a room temperature to form the water sterilization electrode having the oxide nanostructures on the conductive medium.

In some embodiments, the heating apparatus includes one of an oven, a furnace, or a heating room. In some embodiments, the elevated temperature is about 200-1000° C. In some embodiments, the one or more oxidizing gases include at least one of air, moisture, oxygen, or an oxidative gas.

In some instances, the conductive medium includes one of a macro porous or non-porous conductive mesh, foam, film, or sheet. In some embodiments, the conductive medium includes one or more of silver, copper, nickel, silicon, or $MoS_2$.

In some embodiments, growing the oxide nanostructures on the conductive medium is conducted at the elevated temperature for more than 0.5 hours. In some embodiments, growing the oxide nanostructures on the conductive medium is conducted at the elevated temperature for more than one hour.

In some embodiments, the oxide nanostructures include nanowires having a length of 1-10 micro meters.

In another aspect, the disclosure describes a water sterilization device. The water sterilization device includes a conduit including an inlet to receive water and an outlet to discharge water; a water sterilization electrode disposed in the conduit between the inlet and the outlet; and a power source configured to provide power to the water sterilization electrode. The power source provides to the water sterilization electrode an alternative current power having a voltage greater than 5 volts at a frequency of less than 100 Hz.

In some embodiments, the water sterilization electrode includes a conductive medium and oxide nanostructures formed on the conductive medium. In some embodiments, the conductive medium includes one of a macro porous or non-porous conductive mesh, foam, film, or sheet. In some embodiments, the conductive medium includes one or more of silver, copper, nickel, silicon, $MoS_2$.

In some embodiments, the oxide nanostructures include nanowires having a length of 1-10 micro meters. In some embodiments, the conductive medium includes a copper foam body. In some embodiments, the nanostructures include nanowires of CuO.

In another aspect, the disclosure describes another water sterilization device. The water sterilization device includes a conduit including an inlet to receive water and an outlet to discharge water; a water sterilization electrode disposed in the conduit between the inlet and the outlet, the water sterilization electrode including a conductive medium and oxide nanostructures formed on the conductive medium; and a power source configured to provide power to the water sterilization electrode. The power source provides to the water sterilization electrode an alternative current power. In some embodiments, the oxide nanostructures formed on the conductive medium include an oxide of the conductive medium.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 9A is a schematic diagram illustrating a water sterilization device according to one example embodiment.

DETAILED DESCRIPTION OF EMBODIMENTS

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to methods for making a water sterilization electrode having nanostructures, and to water sterilization devices that contain the water sterilization electrode.

Figure 1:
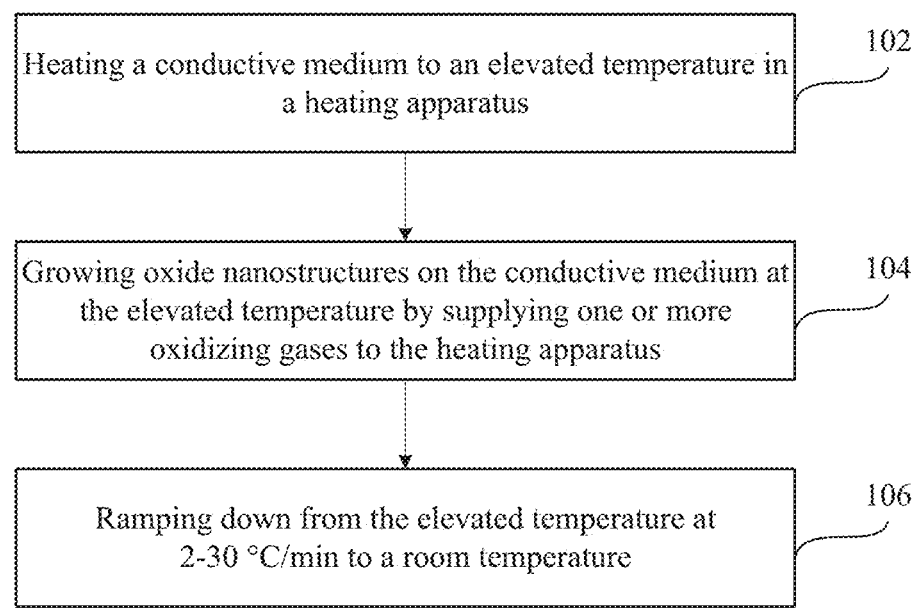
FIG. 1 is a flow chart illustrating a method for forming a water sterilization electrode, according to one example embodiment.

Embodiments will now be explained with accompanying figures. Reference is first made to FIG. 1. FIG. 1 is a flow chart illustrating a method 100 for forming a water sterilization electrode according to one example embodiment. At 102, a conductive medium is heated to an elevated temperature in a heating apparatus. In one embodiment, the heating apparatus may include one of an oven, a furnace, a heating room, or other thermal devices. In some embodiments, the conductive medium may include one of a macro porous or non-porous conductive mesh, foam, film, or sheet, which may be made of one or more materials including silver, copper, nickel, silicon, $MoS_2$, or other suitable conductive materials. The conductive medium may be placed in the heating apparatus in vertical, horizontal or other directions. In some embodiments, one or more conductive media may be placed on a rack, a shelf, a holder, or other supports that can carry the conductive media for processing in the heating apparatus. The conductive medium may be in various shapes, e.g., square, round, or polygon, and various size. While one or more conductive media are placed on a rack, a shelf, a holder, or other supports, they may be stacked or in separate pieces.

In some embodiments, the elevated temperature is about 200-1000° C. For example, the heating apparatus may be ramped up to 200-1000° C. at 2-30° C./min. The conductive media may be placed in the heating apparatus while the temperature in the heating apparatus is ramped up or after the internal temperature of the heating apparatus reaches a target elevated temperature.

At 104, oxide nanostructures are grown on the conductive medium at the elevated temperature by supplying one or more oxidizing gases to the heating apparatus. To produce an effective water sterilization electrode, the conductive medium is provided with nanostructures. For example, oxide nanostructures may be grown on the conductive medium by oxidizing the surface of the conductive medium. In some embodiments, the oxide nanostructures are grown by supplying one or more oxidizing gases to the heating apparatus while the conductive medium is heated to the elevated temperature. The oxide nanostructures may be oxides of the conductive medium. In some embodiments, the elevated temperature is about 200-1000° C., about 200-900° C., about 200-800° C., about 200-700° C., about 200-600° C., about 200-500° C., about 200-400° C., about 200-300° C., about 300-1000° C., about 300-900° C., about 300-800° C., about 300-700° C., about 300-600° C., about 300-500° C., about 300-400° C., about 400-1000° C., about 400-900° C., about 400-800° C., about 400-700° C., about 400-600° C., about 400-500° C., about 500-1000° C., about 500-900° C., about 500-800° C., about 500-700° C., about 500-600° C., about 600-1000° C., about 600-900° C., about 600-800° C., about 600-700° C., about 700-1000° C., about 700-900° C., about 700-800° C., about 800-1000° C., about 800-900° C., or about 900-1000° C.

In some embodiments, the one or more oxidizing gases provided to the heating apparatus may include at least one of air, moisture, oxygen, or an oxidative gas. In some embodiments, it may take more than 0.5 hours to grow sufficient nanostructures on the conductive medium at the elevated temperature. In some embodiments, it may take more than one hour to grow sufficient nanostructures on the conductive medium at the elevated temperature. In some embodiments, the growth of oxide nanostructures are not linear in time. For example, the growth process may include an incubating period for about 0.5, 1, or 1.5 hours in which no visible oxide nanostructures are grown on the conductive medium.

At 106, the temperature in the heating apparatus is ramped down at 2-30° C./min to a room temperature to form the water sterilization electrode having the oxide nanostructures on the conductive medium. To form stable oxide nanostructures on the conductive medium, the temperature of the heating apparatus (and thus the conductive medium) is ramped down in a controlled manner. For example, the temperature is ramped down to the room temperature at 2-30° C./min, 2-25° C./min, 2-20° C./min, 2-15° C./min, 2-10° C./min, or 2-5° C./min.

Figure 2:
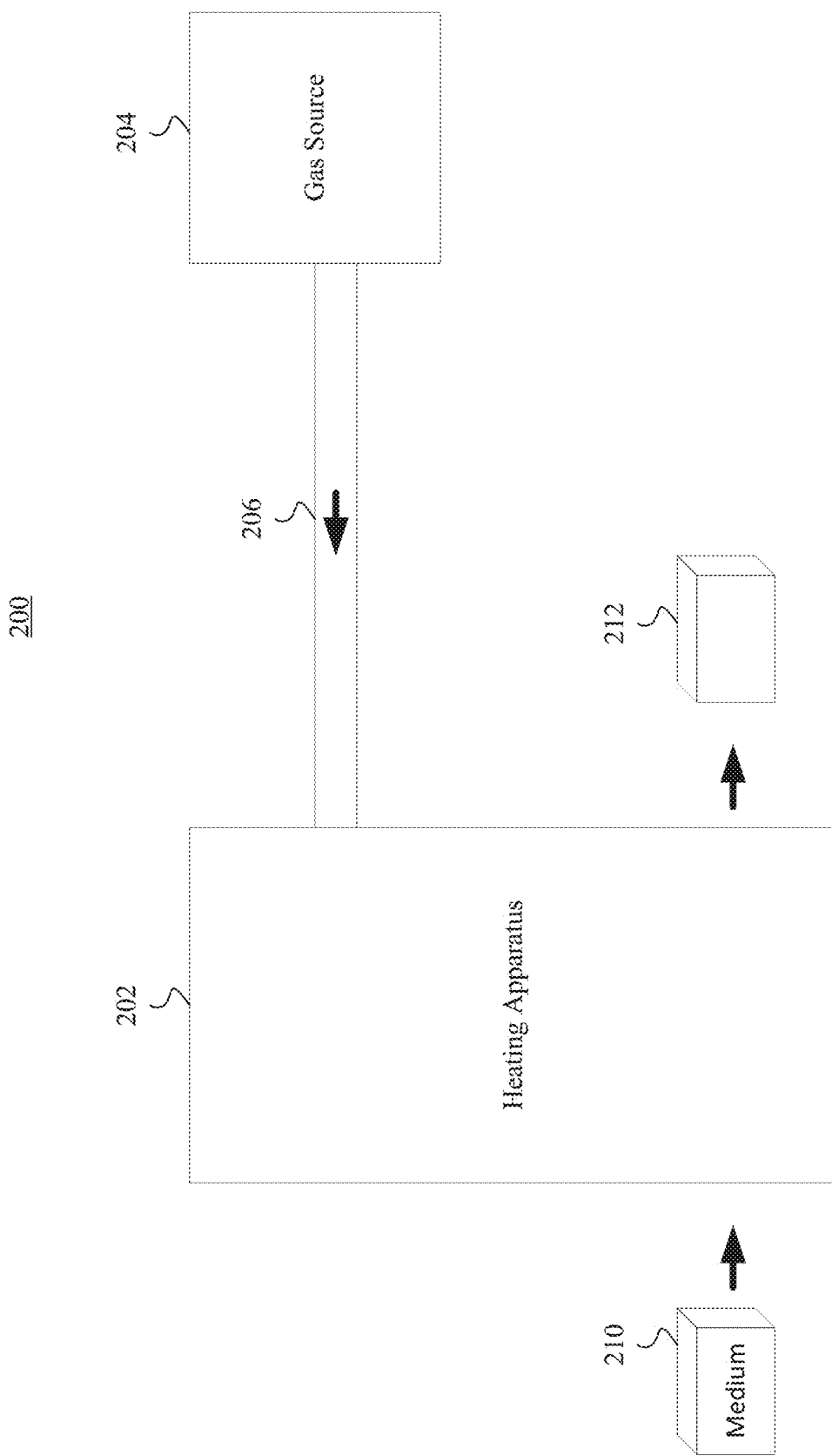
FIG. 2 is a schematic diagram illustrating a system for forming water sterilization electrodes for water sterilization devices, according to one example embodiment.

Reference is now made to FIG. 2. FIG. 2 is a schematic diagram illustrating a system 200 for forming water sterilization electrodes for water sterilization devices, according to one example embodiment. The system 200 includes a heating apparatus 202, a gas source/pump 204, and a pipe 206 connecting the heating apparatus 202 and the gas source/pump 204. The heating apparatus 202 may be an oven, a furnace, a heating room, or other suitable heating equipment. The conductive medium 210 may be placed in the heating apparatus 202 before or after the temperature in the heating apparatus 202 is ramped up. In some embodiments, after the temperature in the heating apparatus 202 reaches a target elevated temperature, the gas source 204 is controlled to supply one or more oxidizing gas via the pipe 206 to the heating apparatus 202 for a predetermined time, e.g., 30, 60, or 90 minutes. The oxidizing gas may be one or more of air, oxygen, or an oxidative gas. This allows the oxide nanostructures to grow on the conductive medium 210 to form a water sterilization electrode 212. In some embodiments, the oxide nanostructures include nanowires having a length of 1-10 or 5-10 micro meters. For example, when a Cu porous foam is used as the conductive medium 210, CuO nanowires may be grown on the Cu porous foam in the system 200.

Figure 3:
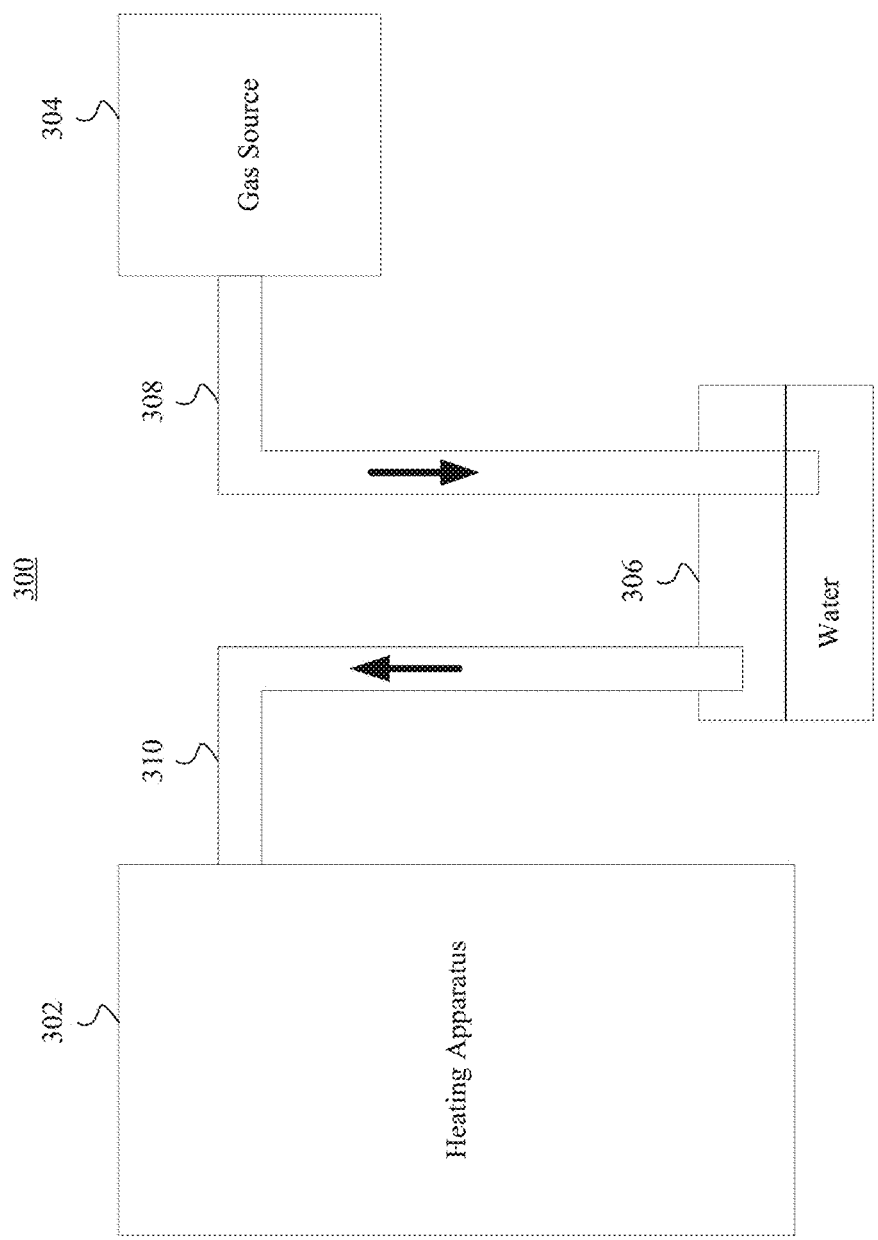
FIG. 3 is a schematic diagram illustrating another system for forming water sterilization electrodes for water sterilization devices, according to one example embodiment.

FIG. 3 is a schematic diagram illustrating another system 300 for forming water sterilization electrodes for water sterilization devices, according to one example embodiment. The system 300 includes a heating apparatus 302, a gas source/pump 304, a water tank 306, a first pipe 308 connecting the gas source/pump 304 and the water tank 306, and a second pipe connecting the water tank 306 and the heating apparatus 302. Similar to the operations in the system 200, the medium may be placed in the heating apparatus 302 before or after the temperature in the heating apparatus 302 is ramped up. In some embodiments, after the temperature in the heating apparatus 302 reaches a target elevated temperature, the gas source 304 is controlled to supply one or more oxidizing gas via the first pipe 308 to the water tank 306. The oxidizing gas may be one or more of dry air, oxygen, or a dry oxidative gas. The oxidizing gas is directed into the water before leaving the water tank 306 to enter the second pipe 310. The oxidizing gas in the second pipe 310 in turn carries moisture and is supplied to the heating apparatus 302, where the conductive medium is placed. This allows the oxide nanostructures to grow on the conductive medium to form a water sterilization electrode.

In some embodiments, under the same heating condition, the nanostructures grown using moisture oxidizing gases (e.g. in the system 200) are denser on the conductive medium than using dry oxidizing gases (e.g. in the system 100).

Figure 4B:
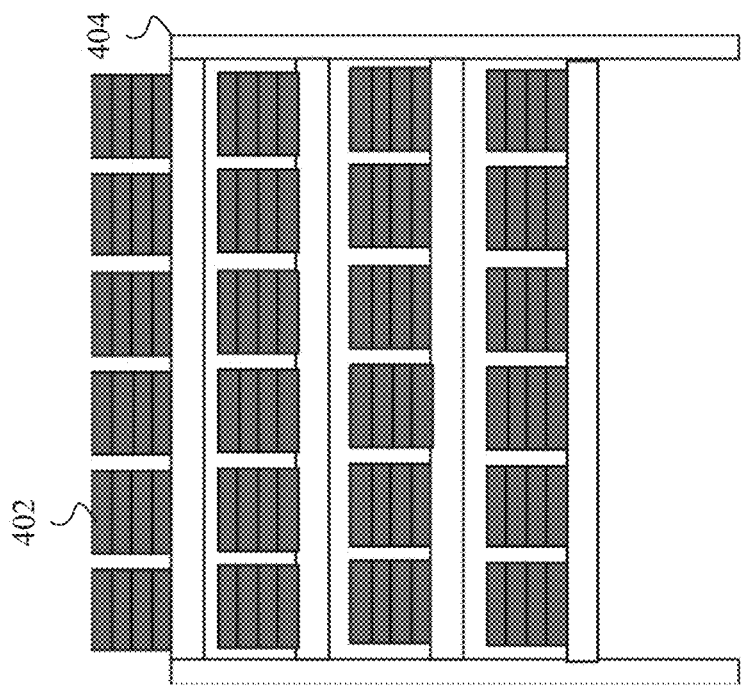
FIGS. 4A and 4B are perspective and side views illustrating a manner in which conductive media are placed on a holder, according to one example embodiment.
Figure 4A:
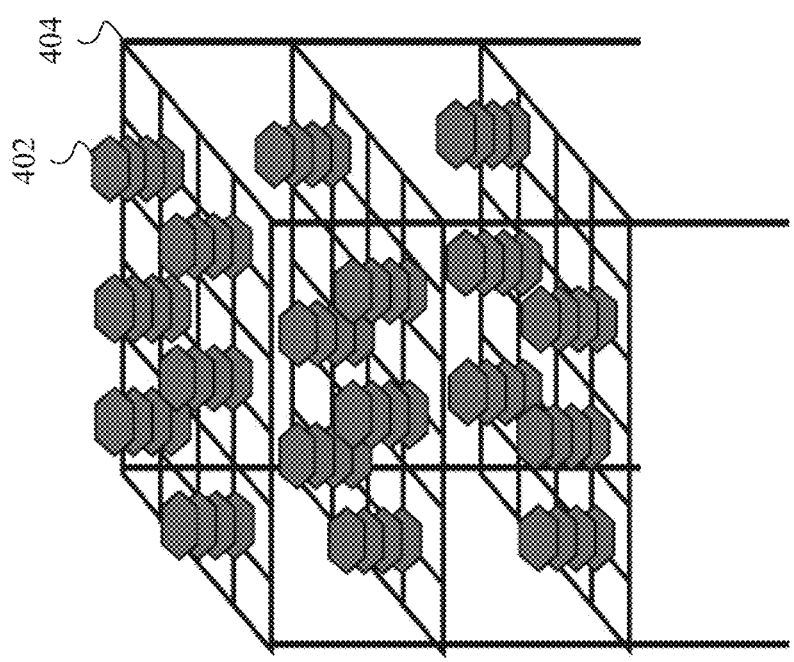

FIGS. 4A and 4B are perspective and side views illustrating a manner in which conductive media 402 are placed on a holder 404, according to one example embodiment. As shown in FIGS. 4A and 4B, the conductive media 402 are plates of a hexagonal shape. A predetermined number of conductive media 402 are stacked on each other to form a pile. Multiple piles of stacked conductive media 402 are placed on a meshed surface of the holder 404. The holder 404 may have one or more meshed surfaces to hold piles of stacked conductive media 402. In this arrangement, a main surface of a conductive medium is placed substantially in the horizontal direction. The holder 404 is designed to fit in a heating apparatus (e.g., the heating apparatus 202 and 302) to facilitate processing of the conductive media 402 to form water sterilization electrodes.

Figure 5B:
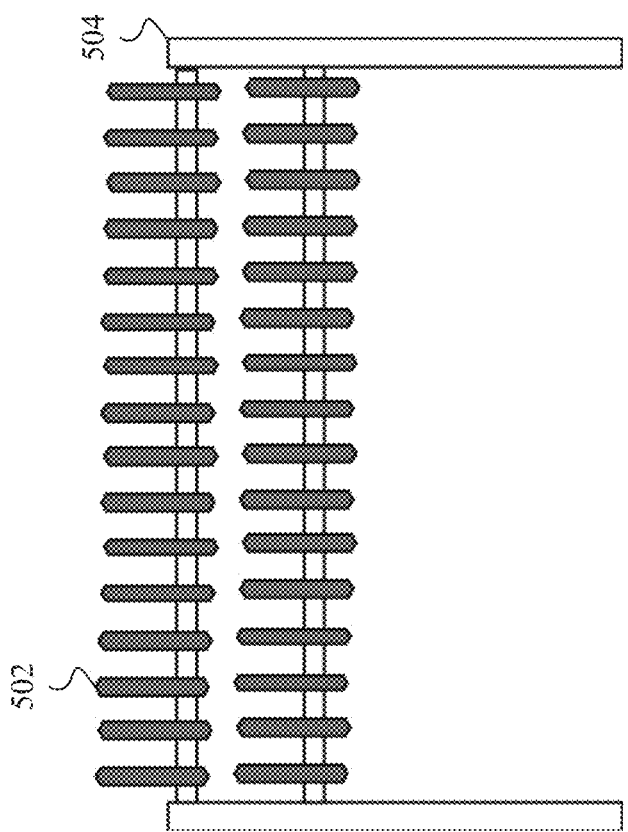
FIGS. 5A and 5B are perspective and side views illustrating another manner in which conductive media are placed on a holder, according to one example embodiment.
Figure 5A:
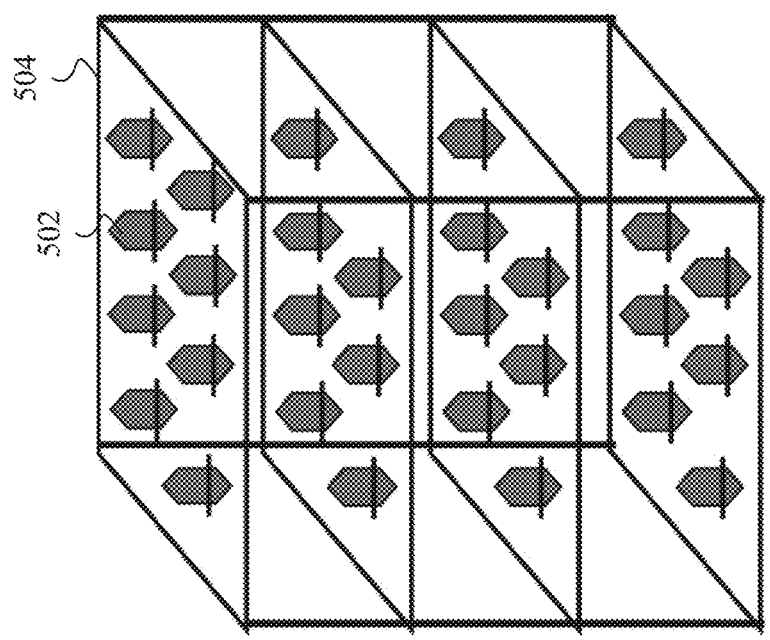

FIGS. 5A and 5B are perspective and side views illustrating another manner in which conductive media 502 are placed on a holder 504, according to one example embodiment. In the illustrated example, the conductive media 502 are plates of a hexagonal shape. Each of the conductive media 502 is hanging on a surface of the holder 504 with a main surface of a conductive medium 502 maintaining a non-zero angle with the surface of the holder 504. In this arrangement, a main surface of a conductive medium 504 can placed in a vertical or other inclined directions. Similarly, the holder 504 is designed to fit in a heating apparatus (e.g., the heating apparatus 202 and 302) to facilitate processing of the conductive media 502 to form water sterilization electrodes.

Figure 6B:
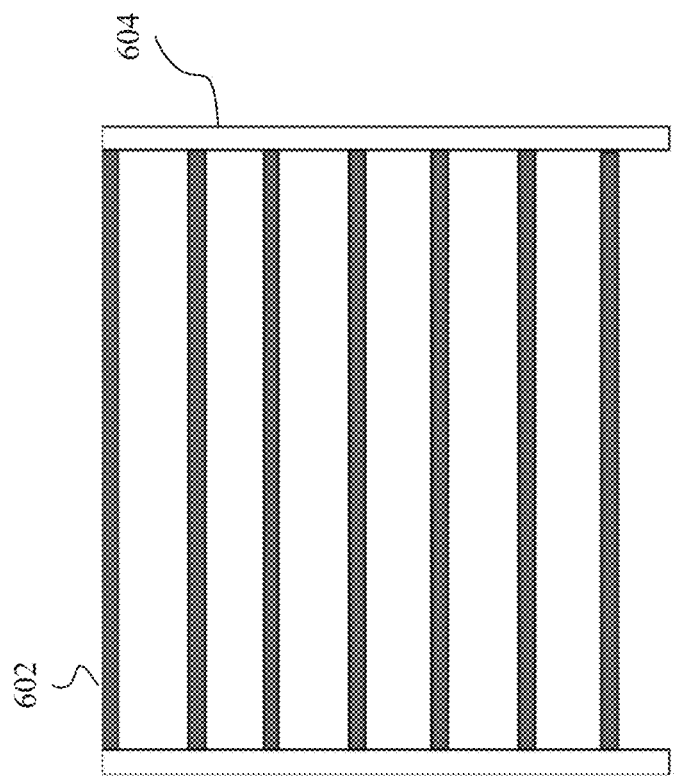
FIGS. 6A and 6B are perspective and side views illustrating a further manner in which conductive media are placed on a holder, according to one example embodiment.
Figure 6A:
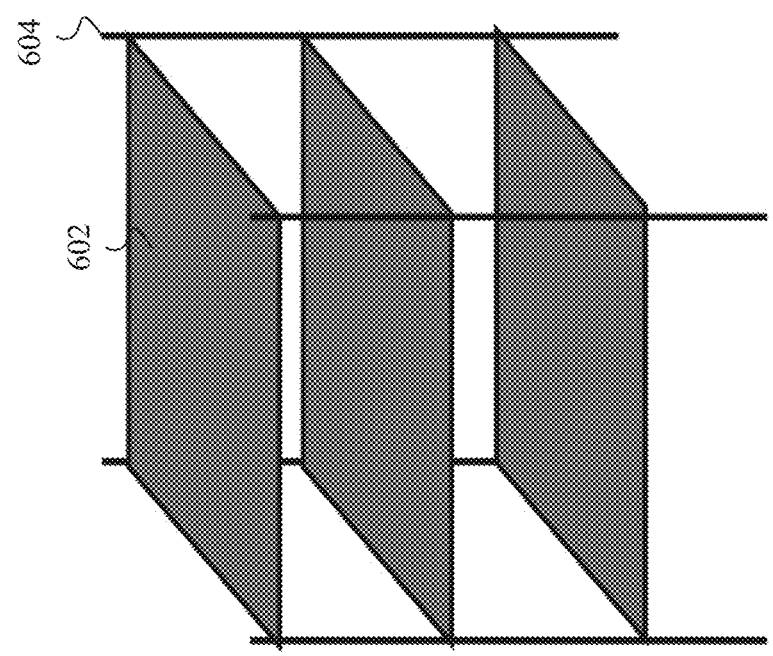

FIGS. 6A and 6B are perspective and side views illustrating another manner in which conductive media 602 are placed on a holder 604, according to one example embodiment. The conductive media 602 are in a form of large plates/sheets attached to the holder 604. Each of the conductive media plates 602 are separated by a predetermined distance. This configuration allows forming of large size water sterilization electrodes.

Figure 7B:
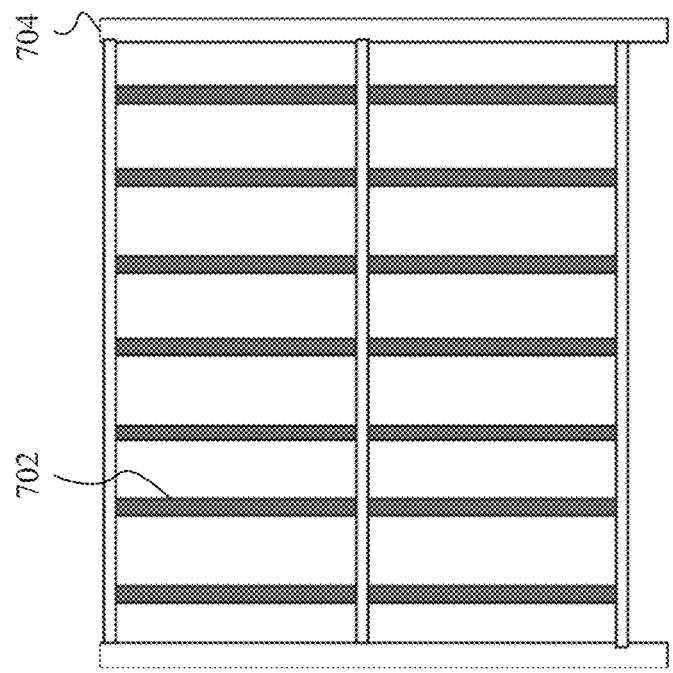
FIGS. 7A and 7B are perspective and side views illustrating a further manner in which conductive media are placed on a holder, according to one example embodiment.
Figure 7A:
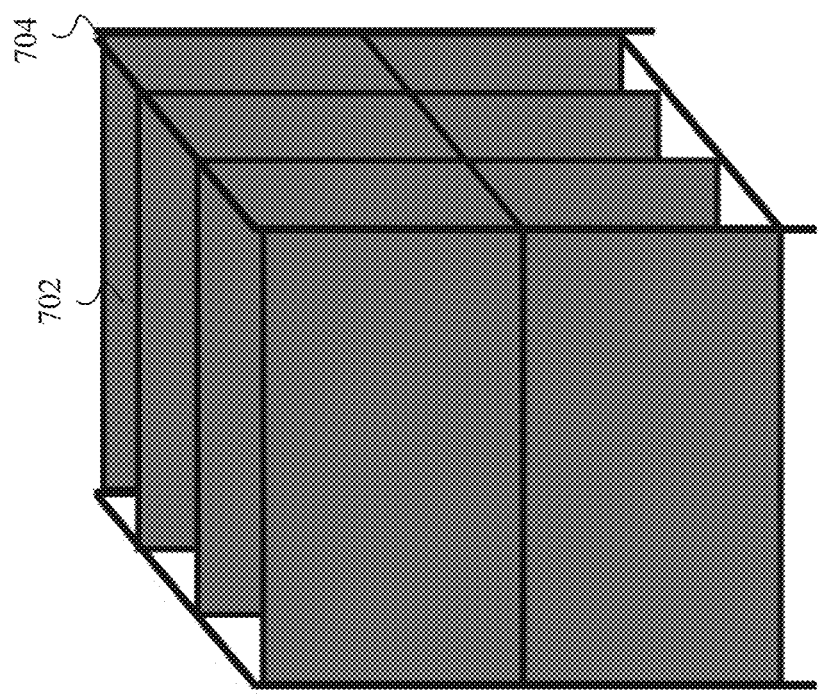

FIGS. 7A and 7B are perspective and side views illustrating another manner in which conductive media 702 are placed on a holder 704, according to one example embodiment. The conductive media 702 are in a form of large plates/sheets attached to the holder 704 and are disposed vertically with respect to a heating apparatus. Each of the conductive media plates 702 are separated by a predetermined distance. This configuration allows forming of large size water sterilization electrodes.

A water sterilization electrode formed by the above embodiments includes a conductive medium and nanostructures formed on the conductive medium. In some embodiments, the conductive medium may include a porous body. A pore size of the porous body can be selected based on a typical size of organisms to be inactivated. For example, in the case of bacteria, a pore size can be selected to be greater than a typical size of bacteria to be inactivated, thereby allowing passage of bacteria with little or no clogging of a porous body. In some embodiments, the porous body can include pores that are sufficiently sized in the micrometer range, such as at least about 5 µm or at least about 10 µm and up to about 1 mm. In some instances, a pore size can be in the range of about 5 µm to about 900 µm, about 10 µm to about 800 µm, about 10 µm to about 700 µm, about 10 µm to about 600 µm, about 10 µm to about 500 µm, about 20 µm to about 400 µm, about 30 µm to about 300 µm, about 40 µm to about 300 µm, about 50 µm to about 300 µm, or about 50 µm to about 200 µm. In the case of other types of organisms, a pore size can be suitably selected in accordance with a typical size of those organisms. For example, in the case of viruses, a pore size can be selected to be in the nanometer range, such as at least about 100 nm and up to about 1 µm. As can be appreciated, pores of a porous body can have a distribution of sizes, and a pore size can refer to an effective size across the distribution of sizes or an average or median of the distribution of sizes.

The porous body may be characterized by its porosity, which is a measure of the extent of voids resulting from the presence of pores or any other open spaces in the porous body. A porosity can be represented as a ratio of a volume of voids relative to a total volume, namely between 0 and 1, or as a percentage between 0% and 100%. In some embodiments, a porous body can have a porosity that is at least about 0.05 or at least about 0.1 and up to about 0.95, and, more particularly, a porosity can be in the range of about 0.1 to about 0.9, about 0.2 to about 0.9, about 0.3 to about 0.9, about 0.4 to about 0.9, about 0.5 to about 0.9, about 0.5 to about 0.8, or about 0.6 to about 0.8. Techniques for determining porosity include, for example, porosimetry and optical or scanning techniques.

In some embodiments, the nanostructures formed on the conductive medium may be nanowires. The nanowires have an average or median diameter in the range of about 1 nm to about 200 nm, about 1 nm to about 150 nm, about 10 nm to about 100 nm, about 20 nm to about 100 nm, about 30 nm to about 100 nm, or about 40 nm to about 100 nm, an average or median length in the range of about 500 nm to about 100 µm, about 800 nm to about 50 nm, about 1 µm to about 40 µm, about 1 µm to 30 µm, about 1 µm to about 20

μm, about 1 μm to about 10 μm, or about 5 μm to about 10 μm and an average or median aspect ratio in the range of about 5 to about 2,000, about 50 to about 1,000, about 100 to about 900, about 100 to about 800, about 100 to about 700, about 100 to about 600, or about 100 to about 500.

In some embodiments, a water sterilization electrode has a sheet resistance that is no greater than about 1,000 Ω/sq, no greater than about 500 Ω/sq, no greater than about 400 Ω/sq, no greater than about 300 Ω/sq, no greater than about 200 Ω/sq, no greater than about 100 Ω/sq, no greater than about 50 Ω/sq, no greater than about 25 Ω/sq, or no greater than about 10 Ω/sq, and down to about 1 Ω/sq, down to about 0.1 Ω/sq, or less.

Figure 8A:
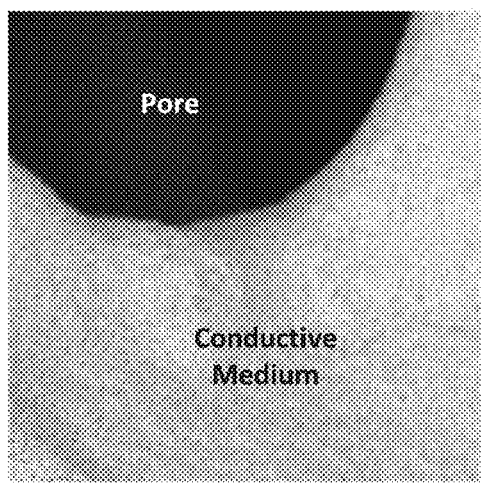
FIGS. 8A-8F are scanning electronic microscopy (SEM) photographs of growing oxide nanostructures on conductive media at an elevated temperature for various times, according to example embodiments.
Figure 8B:
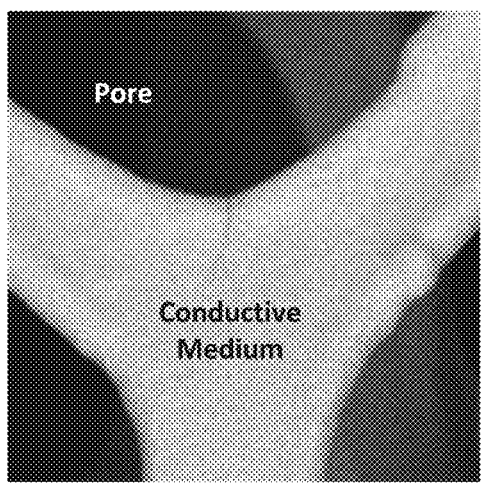

FIGS. 8A and 8B are scanning electronic microscopy (SEM) photographs of growing oxide nanostructures on conductive media at an elevated temperature for a predetermined time T1, according to example embodiments. These samples are processed using the growth system as shown in FIG. 2 or 3. In the illustrated embodiments, the conductive media are copper foams. As evident in FIGS. 8A and 8B, the conductive media include a plurality of pores. Further, no visible nanowires are grown on the conductive media, indicating that the growth process is in the incubating stage.

Figure 8C:
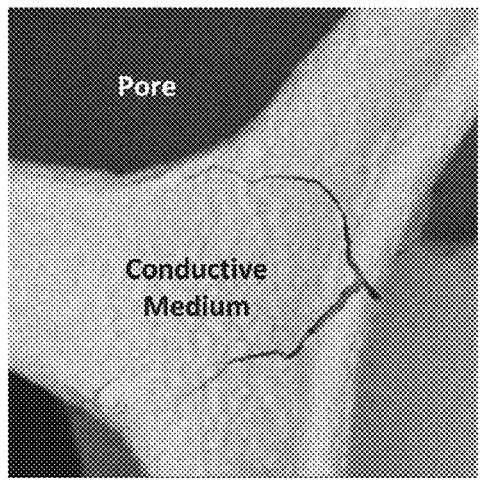
Figure 8D:
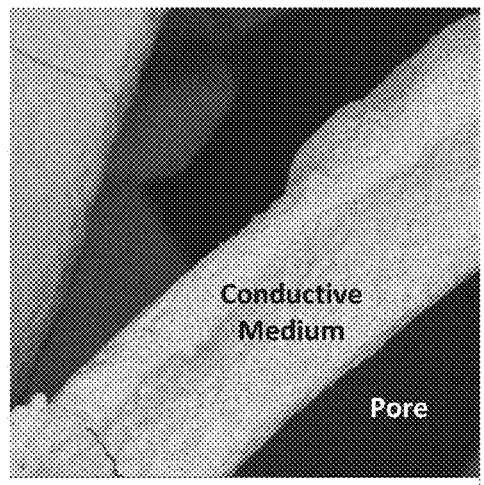

FIGS. 8C and 8D are SEM photographs of growing oxide nanostructures on conductive media at the elevated temperature for a predetermined time T2, according to example embodiments. These samples are processed using the growth system as shown in FIG. 2 or 3. In the illustrated embodiments, the conductive media are copper foams. As seen in FIGS. 8C and 8D, no visible nanowires are grown on the conductive media, indicating that the growth process is still in the incubating stage.

Figure 8E:
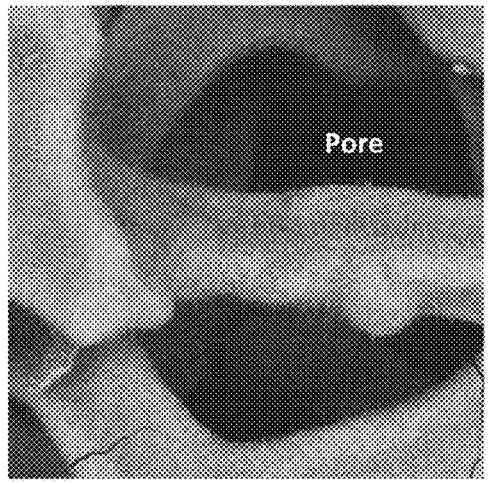
Figure 8F:
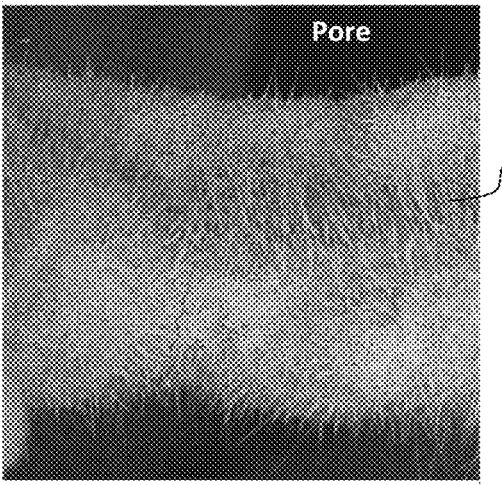

FIGS. 8E and 8F are SEM photographs of growing oxide nanostructures on conductive media at the elevated temperature for a predetermined time T3, according to example embodiments. These samples are processed using the growth system as shown in FIG. 2 or 3. In the illustrated embodiments, the conductive media are copper foams. As seen in FIGS. 8E and 8F, nanowires (CuO) are grown on the conductive media in a high density, which together form a water sterilization electrode.

FIG. 9A is a schematic diagram illustrating a water sterilization device 900 according to one example embodiment. The water sterilization device 900 includes a conduit 901 that has an inlet 902 to receive water and an outlet 904 to discharge the water. The water sterilization device 900 further includes a water sterilization electrode 906a disposed in the conduit 901. The water sterilization electrode 906a can be formed by the embodiments discussed in this disclosure.

The water sterilization device 900 further includes a power source 910 configured to provide power to the water sterilization electrode 906a. In some embodiments, the power source 910 provides a direct current power or an alternating current power to the water sterilization electrode 906a. In some embodiments, the alternating current includes sine waves or square waves. In some embodiments, a frequency of the alternating current is at less than 100 Hz, at less than 1 Hz, at 0 to 100 Hz or at 0 to 1 Hz. In some embodiments, the power source 910 provides a voltage greater than 5 volts to the sterilization electrode 906a.

Figure 9B:
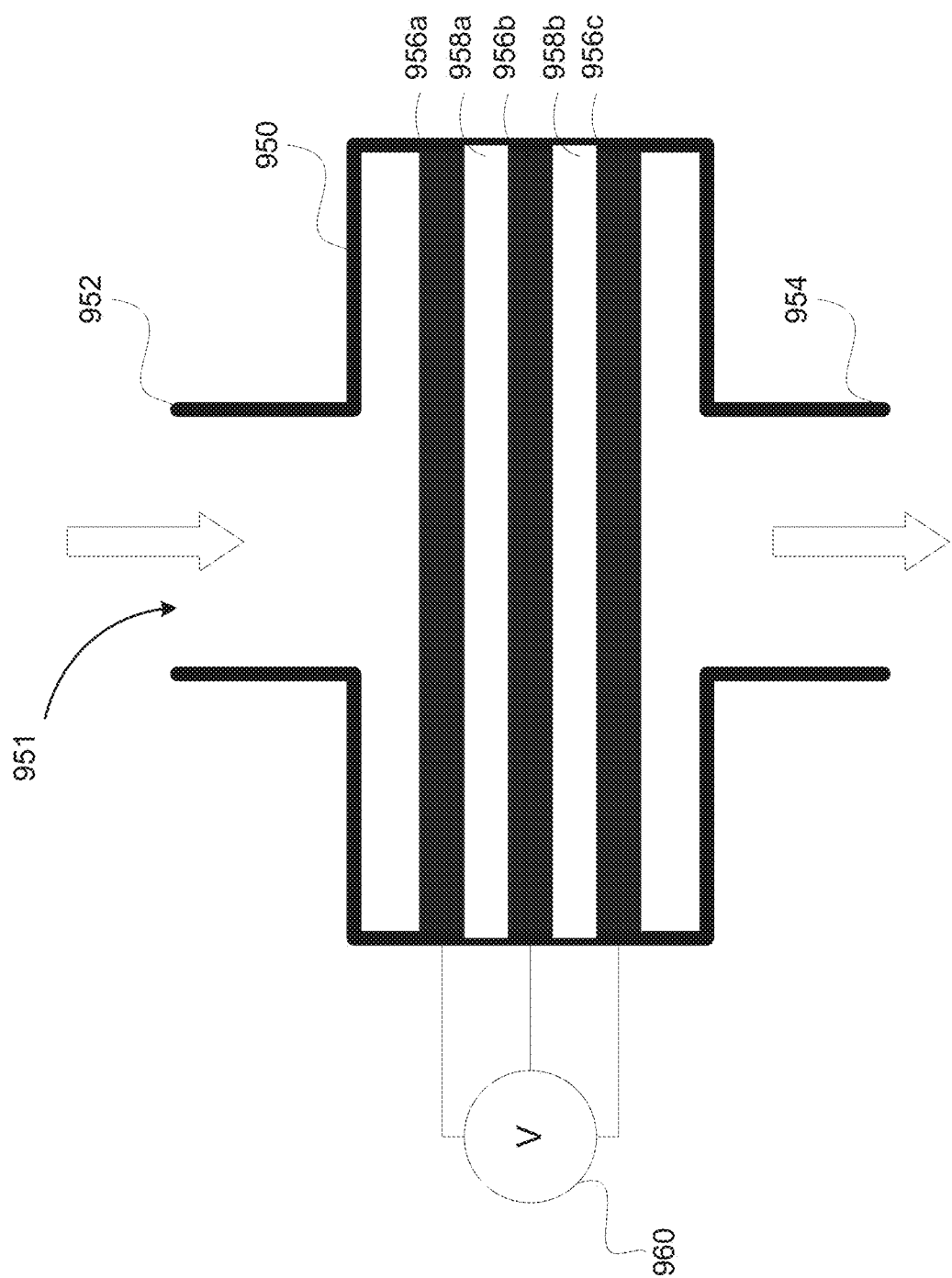
FIG. 9B is a schematic diagram illustrating another water sterilization device according to one example embodiment.

FIG. 9B is a schematic diagram illustrating a water sterilization device 950 that utilize a plurality of water sterilization electrodes, according to one example embodiment. The water sterilization device 950 includes a conduit 951 that has an inlet 952 to receive water and an outlet 954 to discharge the water. The water sterilization device 950 further includes a plurality of water sterilization electrodes disposed in the conduit 951. In the illustrated embodiment, the water sterilization device 950 includes three water sterilization electrodes 956a-c and two porous separators 958a-b. Each of the porous separators 958a-b is interposed between two adjacent electrodes 956. As shown in FIG. 9B, the porous separator 958a is interposed between electrodes 956a and 956b, and the porous separator 958b is interposed between electrodes 956b and 956c. The electrodes 956 and the porous separators 958 are stacked one over another without a gap therebetween. Although three water sterilization electrodes and two porous separators are illustrated in FIG. 9B, the present disclosure is not so limited. More water sterilization electrodes and porous separators can be disposed in the conduit 951 to form a compact and efficient water sterilization device based on needs and its applications.

The water sterilization device 950 further includes a power source 960 configured to provide power to the electrodes 956. In one embodiment, the power source 960 supplies a first type of voltage to the water sterilization electrodes 956a and 956c, and supplies a second type of voltage to the water sterilization electrode 956b. The second type is opposite to the first type. For example, the first type and the second type could be positive and negative, respectively, or vice versa. In some embodiments, a voltage difference between the first type of voltage and the second type of voltage is from bout 0 to about 40 Volts, or from about 20 to about 40 Volts, or more than 5 Volts.

In some embodiments, the power source provides a direct current or an alternating current to the water sterilization electrodes 956. In some embodiments, the alternating current includes sine waves or square waves. In some embodiments, a frequency of the alternating current is at less than 100 Hz, at less than 1 Hz, at 0 to 100 Hz or at 0 to 1 Hz.

The porous separators 958 may include a porous polymer or mesh that provide insulation between two adjacent water sterilization electrodes 956. In some embodiments, materials for the water sterilization electrodes 956 and the porous separators 958 are selected such that they are hydrophilic or have a high permeability to water. The inlet 952 and the outlet 954 may include fitting mechanisms (not shown) to connect with an upstream pipe or container and a downstream pipe or container, respectively.

In the illustrated embodiments, the water sterilization provides sterilization via an electrical mechanism, with a high surface area of the conductive medium and nanostructures along with an induced electric field in the vicinity of the nanostructures providing effective bacterial inactivation.

In some embodiments, the bacterial, virus and protozoa (cysts) inactivation efficiency of the devices 900 and 950 is at least about 95%, or at least about 98%, and up to about 99%, up to about 99.5%, up to about 99.9%, up to 99.99%, up to 99.999% or up to 99.9999%. Such inactivation efficiency can be achieved with a short incubation time, such as in the range of about 0.1 sec to about 1 min, about 0.1 sec to about 50 sec, about 0.5 sec to about 40 sec, about 0.5 sec to about 30 sec, about 0.5 sec to about 20 sec, about 0.5 sec to about 10 sec, or about 0.5 sec to about 5 sec.

Table 1 below provides example embodiments illustrating inactivation efficiency of water sterilization devices in connection with various conditions, where water flows through the water sterilization devices by gravity.

TABLE 1

| Frequency (Hz) | Flow rate (L/min) | Voltage (V) | Distance (mm) | Efficiency |
|---|---|---|---|---|
| 0.5 | 0.3 | 10 | 0 | Lose effect after 30 gallon water |
| 1 | 0.3 | 10 | 0 | 99.99% |
| 0.5 | 3 | 10 | 1 | 99% |
| 1 | 3 | 10 | 1 | 99% |
| 0.5 | 0.6 | 10 | 1 | 99.99% |
| 1 | 0.6 | 10 | 1 | 99.99% |
| 1 | 1.5 | 7.5 | 1 | 99.9999% |
| 1 | 1.5 | 7.5 | 1 | 99.9999% |

Table 2 below provides example embodiments illustrating stability test results of water sterilization devices. The results indicate that the water sterilization devices are of high efficiency and stability.

TABLE 2

| Trial | Long-term stability | Flow rate | Parameters |
|---|---|---|---|
| 1 | 1500 hours with 99.999% efficiency<br>Virus: 99%<br>No decay | 8 gallon/hour | 10 V AC sin wave 1 Hz |
| 2 | 600 hours with 99.999% to 99.9999% efficiency<br>Virus: 99.999% to 99% | 8 gallon/hour | 10 V AC sin wave 1 Hz |
| 3 | 99.999% at 5 V AC<br>300 hours 99.9999% efficiency at 7.5 V AC | 8 gallon/hour | 7.5 V AC sin wave 1 Hz |

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for forming a water sterilization electrode, the method comprising:
   heating a conductive medium to an elevated temperature of about 200-1000° C. in a heating apparatus;
   growing oxide nanostructures on the conductive medium at the elevated temperature by supplying one or more oxidizing gases to the heating apparatus; and
   ramping down from the elevated temperature at 2-30° C./min to a room temperature to form the water sterilization electrode having the oxide nanostructures on the conductive medium.

2. The method of claim 1, wherein the heating apparatus includes one of an oven, a furnace, or a heating room.

3. The method of claim 1, wherein the elevated temperature is about 500-1000° C.

4. The method of claim 1, wherein the one or more oxidizing gases include at least one of air, moisture, oxygen, or an oxidative gas.

5. The method of claim 1, wherein the conductive medium includes one of a macro porous or non-porous conductive mesh, foam, film, or sheet.

6. The method of claim 5, wherein the conductive medium includes one or more of silver, copper, nickel, silicon, or $MoS_2$.

7. The method of claim 1, further comprising: growing the oxide nanostructures on the conductive medium at the elevated temperature for more than 0.5 hours.

8. The method of claim 7, further comprising: growing the oxide nanostructures on the conductive medium at the elevated temperature for more than one hour.

9. The method of claim 1, wherein the oxide nanostructures include nanowires having a length of 1-10 micro meters.

10. A water sterilization method, comprising:
    providing a conduit including an inlet to receive water and an outlet to discharge water;
    providing a water sterilization electrode disposed in the conduit between the inlet and the outlet; and
    providing a power source configured to provide power to the water sterilization electrode,
    wherein the power source provides to the water sterilization electrode an alternative current power having a voltage greater than 5 volts at a frequency at less than 100 Hz; and
    wherein the water sterilization electrode is formed by:
       heating a conductive medium to about 200-1000° C. in a heating apparatus;
       growing oxide nanostructures on the conductive medium at the elevated temperature by supplying one or more oxidizing gases to the heating apparatus; and
       ramping down from the elevated temperature at 2-30° C./min to a room temperature to form the water sterilization electrode having the oxide nanostructures on the conductive medium.

11. The method of claim 10, wherein the water sterilization electrode includes a conductive medium and oxide nanostructures formed on the conductive medium.

12. The method of claim 11, wherein the conductive medium includes one of a macro porous or non-porous conductive mesh, foam, film, or sheet.

13. The method of claim 12, wherein the conductive medium includes one or more of silver, copper, nickel, silicon, or $MoS_2$.

14. The method of claim 11, wherein the oxide nanostructures include nanowires having a length of 1-10 micro meters.

15. The method of claim 11, wherein the conductive medium includes a copper foam body.

16. The method of claim 15, wherein the nanostructures include nanowires of CuO.

17. A water sterilization method, comprising:
    providing a conduit including an inlet to receive water and an outlet to discharge water;
    providing a water sterilization electrode disposed in the conduit between the inlet and the outlet, wherein the water sterilization electrode includes a conductive medium and oxide nanostructures formed on the conductive medium; and
    providing a power source configured to provide power to the water sterilization electrode,
    wherein the power source provides to the water sterilization electrode an alternative current power; and
    wherein the water sterilization electrode is formed by:

heating the conductive medium to about 200-1000° C. in a heating apparatus;

growing the oxide nanostructures on the conductive medium at the elevated temperature by supplying one or more oxidizing gases to the heating apparatus; and ramping down from the elevated temperature at 2-30° C./min to a room temperature to form the water sterilization electrode having the oxide nanostructures on the conductive medium.

18. The method of claim 17, wherein the conductive medium includes one of a macro porous or non-porous conductive mesh, foam, film, or sheet.

19. The method of claim 17, wherein the oxide nanostructures formed on the conductive medium include an oxide of the conductive medium.

20. The method of claim 17, wherein the conductive medium includes one or more of silver, copper, nickel, silicon, or $MoS_2$.

* * * * *